United States Patent [19]

Lemaire et al.

[11] Patent Number: 5,444,768
[45] Date of Patent: Aug. 22, 1995

[54] PORTABLE COMPUTER DEVICE FOR AUDIBLE PROCESSING OF REMOTELY STORED MESSAGES

[75] Inventors: Charles A. Lemaire, Zumbrota, Minn.; Thomas Schick, Raleigh, N.C.; Bryan L. Striemer, Zumbrota, Minn.

[73] Assignee: International Business Machines Corporation, Armonk, N.Y.

[21] Appl. No.: 815,664

[22] Filed: Dec. 31, 1991

[51] Int. Cl.6 ............................................. H04M 1/64
[52] U.S. Cl. ........................................ 379/68; 379/67; 379/85; 379/87; 379/88; 379/97; 379/100
[58] Field of Search ...................... 379/68, 67, 88, 89, 379/85, 87, 101, 96, 97

[56] References Cited

U.S. PATENT DOCUMENTS

| | | | |
|---|---|---|---|
| 4,481,382 | 11/1984 | Villa-Real | 379/88 |
| 4,821,311 | 4/1989 | Hashimoto | 379/67 |
| 4,837,798 | 6/1989 | Cohen et al. | 379/88 |
| 4,868,865 | 9/1989 | Ogawa | 379/67 |
| 4,900,902 | 2/1990 | Sakakibara | 379/100 |
| 4,926,463 | 5/1990 | Ukegawa | 379/88 |
| 4,932,042 | 6/1990 | Baral et al. | 379/67 |
| 4,972,457 | 11/1990 | O'Sullivan | 379/59 |
| 4,989,238 | 1/1991 | Iggulden et al. | 379/100 |
| 4,996,704 | 2/1991 | Brunson | 379/67 |
| 4,996,707 | 2/1991 | O'Malley et al. | 379/100 |
| 5,014,296 | 5/1991 | Saigano | 379/100 |
| 5,023,903 | 6/1991 | Bowen | 379/67 |

Primary Examiner—James L. Dwyer
Assistant Examiner—Fan Tsang
Attorney, Agent, or Firm—Steven W. Roth; Andrew J. Dillon

[57] ABSTRACT

A battery powered hand-held portable computer device for audible processing of messages stored at one or more remote central message facilities. A telephonic interface is included within the portable computer device. A connection between the portable computer device and the remote central message facility is automatically established in response to a connection to a telephonic network and the operation of a single switch. Thereafter, selected audio and/or digital messages from a remote central message facility are transferred to the portable computer device, digitized if necessary, and stored within random access memory or stored utilizing analog storage systems. The portable computer device preferably utilizes a limited number of tape recorder-like switches. In response to a single operation of a "start" switch, electronic messages stored in a digital format are sequentially coupled to a text-to-speech conversion application and converted to audible speech through a speaker or headphone. In one embodiment of the present invention, the portable computer device includes a microphone and analog-to-digital conversion circuitry which permit a spoken input to be digitized, stored and subsequently transmitted to the remote central message facility. Additionally, a message may be "scanned" or "rewound" at higher than normal speed to access a selected portion thereof.

30 Claims, 8 Drawing Sheets

PORTABLE COMPUTER DEVICE FOR AUDIBLE PROCESSING OF REMOTELY STORED MESSAGES

CROSS-REFERENCE TO RELATED APPLICATION

The present application is related to U.S. patent application Ser. No. 07/671,329, filed Mar. 19, 1991, entitled "Portable Computer Device for Audible Processing of Electronic Documents," naming certain of the inventors named herein and assigned to the assignee set forth herein.

BACKGROUND OF THE INVENTION

1. Technical Field

The present invention relates in general to the field of improved computer devices and in particular to improved computer devices which permit the audible processing of remotely stored messages. Still more particularly, the present invention relates to a simplified user interface which permits the audible processing of copies of remotely stored messages within a portable battery powered computer device.

2. Description of the Related Art

The modern electronic office represents a substantial increase in the productivity and accuracy with which documents and audio messages may be processed. The modern electronic office permits a single user to process large amounts of information and rapidly and efficiently direct that information utilizing computer and telephone networks to various other users, sometimes separated by thousands of miles. However, this increase in efficiency carries with it a certain lack of flexibility in that a user must be in his or her office, at the desk, logged into a computer or dialed into the telephone system in order to accomplish this work.

Telephone messages stored within a phone-mail system do not generally require real time response. That is, a user is generally free to ignore such messages until a convenient time is found to listen to those messages. Thereafter, the user takes notes as to who called and the reason for the call and discards the phone-mail message. Some phone-mail systems allow the user who is listening to a message to record a voice message response which is then automatically returned to the caller who left the message. Other phone-mail systems require the user to dial the number of each caller in order to return a message. Existing phone mail systems require a user to be connected to the telephone system and listening, for the entire duration of any recorded message, in order to process phone-mail messages.

Personal phone message recording machines are also known in the prior art, many of which include removable audio tapes which permit a user to remove a tape with recorded phone messages and place that tape in a portable tape player in order to achieve some measure of mobility while listening and processing such audio messages. However, the user must actually go to the physical location of the telephone recording machine in order to remove the tape. Further, a second portable tape recording machine, is required if the user wishes to record a verbal response. Even while utilizing a second portable tape recording machine the user lacks a method whereby the response may be electronically delivered to its logical destination, that is the phone-mail of the original sender.

Verbal communication is enhanced somewhat by the utilization of cordless telephones, since such systems permit the user to wander within a moderate distance without requiring a telephone cable. Additionally, cellular phones have greatly increased this distance, but such systems are costly to purchase and use and are sometimes heavy and awkward to transport. In either event, both of these telephone technologies still require a connection (albeit by radio) to the telephone system for the entire duration of message processing.

Recently, U.S. Pat. No. 4,837,798, issued to Roberta S. Cohen et al., and assigned to American Telephone and Telegraph Company, discloses a communication system having unified messaging wherein a user may originate, receive and manipulate messages in different native media. Messages may be translated from one media to another media for reception and a single message may be composed of parts that use different native media. Thus, the Cohen et al. system permits a user to access messages utilizing a data terminal or a voice terminal; however, the Cohen et al. system may not be utilized to efficiently process electronic messages in a portable manner.

Modern computer systems permit the so-called "telecommuter" to extend the virtual office by connecting home computers to a central computer system utilizing telephone lines. It is also possible to work with stand-alone computers, transferring the work accomplished at such a computer when it is reconnected to the main system. This stand-alone mode of operation is generally done on portable, laptop computers, giving the computer user a great degree of mobility.

One problem which exists with the utilization of laptop computers is that such units are quite large and bulky or, in the alternative, have small screens and keyboards which are difficult to use. There are also times when a computer user may not have free use of his or her hands and eyes but would still be able to process electronic documents if an appropriate interface were possible. For example, it would be desirable to permit a computer user to process electronic mail while driving; however, the inability of current computer devices to permit the processing of electronic documents without reference to a display screen and keyboard makes this impossible.

A recognition in the industry that keyboards and display screens cannot possibly achieve a sufficiently small size while remaining utilitarian has lead to the development of digital organizers and recently, a "palm top" computer which typically utilizes an icon based user interface with a pointing device, such as a pen. These devices have no keyboard and no capability of attaching a keyboard. The primary input to such devices is through character recognition and a pointing device. While these devices can generally recognize printed letters, the difficulty involved in utilizing such devices in hand occupied environments will prevent these devices from achieving universal acceptance.

A likely user interface between a portable electronic device and a user in a hand occupied environment is human speech. Various attempts at achieving such a system have been attempted in the past; however, the interface between the device and the user has always proven to be a difficult hurdle to overcome. For example, a dictation system was disclosed in *International Business Machine's Technical Disclosure Bulletin,* Volume 22, No. 4, in September of 1979, which utilizes solid-state memory devices to store voice input in a digitized format. The system then connects to a host for information transfer; however, the dictation system disclosed therein does not permit a user to process electronic documents.

One attempt at providing audible output associated with textual documents is disclosed in U.S. Pat. No. 4,685,135 entitled "Text-to-Speech Synthesis System," issued to Lin et al. and assigned to Texas Instruments, Incorporated. This system utilizes the well known Naval Research Laboratory text-to-speech algorithm; however, there is no discussion in this patent of an interface which must be utilized to permit a user to process electronic documents utilizing such a device.

Australian Patent 8,319,856 discloses a hand held speech generator which utilizes a keyboard containing phoneme keys and editing keys which represent different spoken sounds through which the final audible word may be created. The editing keys provide means for inserting spaces or pauses, backspacing, deleting words or inserting predefined strings. Such a device may be utilized by a user who is mute to generate spoken language for utilization on a telephone or other communications device; however, there is no discussion in this disclosure of a manner in which synthetically generated speech may be utilized to permit the processing of electronic documents.

U.S. Pat. No. 4,749,353, issued to Paul S. Breedlove and assigned to Texas Instruments Incorporated, discloses a talking electronic learning aid for improvement of spelling which utilizes an operator controlled word list. This device permits a predetermined list of words to be synthetically spoken by storing a plurality of filter coefficients within memory which may be utilized to control the operation of a linear predictive coding voice synthesizer. Each piece of vocabulary which may be uttered by the device must be processed in a sophisticated manner to determine what those filter coefficients must be. The talking electronic learning aid thus may not be utilized to efficiently process electronic documents.

In view of the above, it should be apparent that a need exists for a portable computer device which may be utilized by a user to audibly process electronic and audible telephone messages which are stored at one or more remote central message facilities. Further, the size and portability constraints of such a device are such that the user interface required to operate such a device should be sufficiently simple to permit basic processing to be accomplished utilizing a minimal number of controls, thus obviating the requirement for a full keyboard. Such a device should also have the capability of receiving user input in the form of audible speech and storing that input for future transmission to a remote central message facility.

SUMMARY OF THE INVENTION

It is therefore one object of the present invention to provide an improved computer device.

It is another object of the present invention to provide an improved portable computer device which permits the audible processing of remotely stored electronic and audible telephone messages.

It is yet another object of the present invention to provide a simplified user interface which permits the audible processing of electronic messages stored in either audio or digital format within a portable battery powered computer device.

The foregoing objects are achieved as is now described. A battery powered hand-held portable computer device is disclosed for audible processing of messages stored at one or more remote central message facilities. A telephonic interface is included within the portable computer device. A connection between the portable computer device and the remote central message facility is automatically established in response to a connection to a telephonic network and the operation of a single switch. Thereafter, selected audio and/or digital messages from a remote central message facility are transferred to the portable computer device, digitized if necessary, and stored within memory or stored utilizing analog storage systems. The portable computer device preferably utilizes a limited number of tape recorder-like switches. In response to a single operation of a "start" switch, electronic messages stored in a digital format are sequentially coupled to a text-to-speech conversion application and converted to audible speech through a speaker or headphone. In one embodiment of the present invention, the portable computer device includes a microphone and analog-to-digital conversion circuitry which permit a spoken input to be digitized, stored and subsequently transmitted to the remote central message facility. Additionally, a message may be "scanned" or "rewound" at higher than normal speed to access a selected portion thereof.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
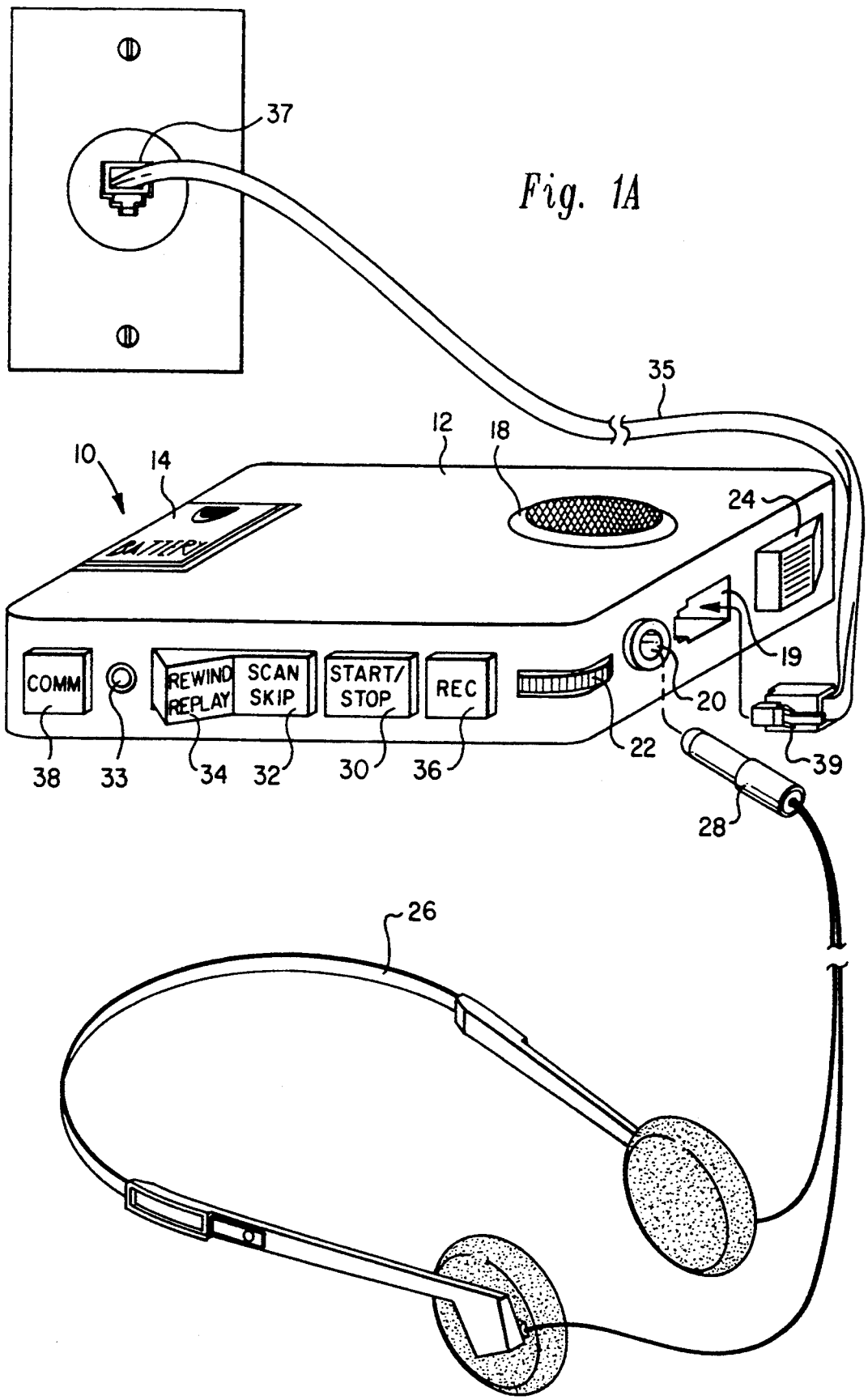
FIG. 1A is a pictorial view of the portable computer device of the present invention.

With reference now to the figures and in particular with reference to FIG. 1A there is depicted a pictorial view of portable computer device 10 of the present invention. As is illustrated, portable computer device 10 is preferably mounted within a case 12 which is constructed utilizing molded plastic or other similar light weight rigid materials. Case 12 is preferably sufficiently small so as to permit portable computer device 10 to be easily carried with a user and is preferably battery powered utilizing a standard storage battery 16 (not shown) which is contained within battery compartment 14.

In accordance with an important feature of the present invention portable computer device 10 includes an audio output device, such as speaker 18, which is utilized to permit the audible processing of electronic messages in a manner which will be explained in greater detail herein. Alternatively, the audio output of portable computer device 10 may be coupled to earphone jack 20 so that electronic messages may be audibly processed privately and without disturbing others in the vicinity of portable computer device 10. Alternatively, portable computer device 10 may be variously coupled to a home stereo system, or to a portable tape recorder.

For such processing, an earphone device 26 may be utilized in conjunction with an earphone plug 28 which is designed to interconnect earphone device 26 with earphone jack 20 in a manner well known in the art. Preferably, volume switch 22 is provided to vary the audible output of portable computer device 10 to achieve an optimum level of volume which permits the accurate understanding of the output thereof without disturbing others in the vicinity of portable computer device 10.

Another important feature of portable computer device 10 is the provision of microphone 24. Microphone 24 is preferably a miniature microphone of any type well known in the art, and may be utilized, in a manner which will be explained in greater detail herein, to permit the user of portable computer device 10 to enter a spoken utterance which will then be digitized and stored as an electronic message.

In accordance with an important feature of the present invention, portable computer device 10 preferably utilizes a simplified interface containing a minimal number of switches. The embodiment depicted includes five such switches and these switches are labeled and utilized in a manner very similar to the controls of an analog tape recorder. Thus, start/stop switch 30 may be utilized to initiate and terminate the processing of electronic messages. Similarly, scan/skip switch 32 may be utilized to scan at high speed or skip forward through a sequential series of electronic messages to locate a particular electronic message, in a manner very similar to this function with a tape recorder or compact disk device. Conversely, rewind/replay switch 34 may be utilized to rewind at high speed or move backward through a sequential series of electronic documents to locate a document previously processed or selectively omitted, in manner which will be explained in much greater detail herein.

In defining the operation of the "switch means" which activate the start/stop function and other features of this invention, the described embodiment implements the "switch means" utilizing buttons which activate electronic circuitry. Another preferred embodiment may utilize "switch means" which consist of an audio microphone connected to signal processing means whereby the apparatus may be voice-activated, either by sound in general, specific sounds, or ultimately by recognition of specific words. These signal processing means are well known to those skilled in the art of voice-activation and are not further described here.

Another possible "switch means" may include any of a number of possible electromagnetic radiation activatable devices such as activation of the start function by detection of the spark-plug noise from a car, if the operator wishes to process documents only while driving, or activation by ultraviolet light for listening outdoors.

Further, the embodiment described herein discloses the activation of the apparatus as being controlled by a "single operation" of the switch means. Those skilled in the art will realize that a double-click of a switch, such as is utilized to activate the switch functions on a mouse device connected to an IBM PS/2 personal computer, is often a preferred activation indication so as prevent accidental activation of some feature. Thus, for purposes of this disclosure a "single operation" of the switch means is intended to encompass any short-term manipulation or other actuation of the switch means which might be recognized by the processing means in the apparatus as being a unique signal from a human operator or other controlling device of the apparatus which is intended to activate any particular feature.

Examples of such "single operation of a switch means" activation may include pressing the same button twice within 0.33 seconds, pressing one button and holding it down while then pressing a second button, or uttering a verbal phrase such as: "START START START" into a microphone.

Additionally, record switch 36 may be utilized, in the manner described herein, to activate microphone 24 such that a limited amount of audible speech may be entered, digitized and stored as a digital. representation of an electronic message, for future processing.

Finally, communication switch 38 is utilized to establish communication between portable computer device 10 and one or more remote central message facilities in a manner which will be explained in greater detail herein. This may be accomplished, by selectively and temporarily interconnecting portable computer device 10 with a remotely located central message facility by means of a telephonic interface circuit (not shown), which may be interconnected to a telephone network by utilizing a telephone cable 35, which may electrically couple portable computer device 10 to a telephone network by engaging a standard RJ-11 telephone jack, such as telephone jack 39 with a standard telephone receptacle 19, within portable computer device 10. Telephone cable 35 is then utilized, in a manner well known to those skilled in the telephone art, to interconnect portable computer device 10 with a telephone network jack 37 in the manner illustrated within FIG. 1A. Of course, those skilled in the art will appreciate that communication switch 38 may be automatically selected in response to the deletion of voltages from the central office on the telephone interface and communications switch 38 may be implemented electronically within case 12.

The various telephone numbers, passwords and access codes necessary to permit portable computer device 10 to access one or more remote central message facilities must be loaded into portable computer device 10 and stored therein. In a manner which will be explained in greater detail herein, such telephone numbers, passwords and access codes may be loaded utilizing either a personal computer or by recording a selected series of tones generated by an ordinary touch-tone telephone in a manner which will be explained in greater detail below.

Of course, the telephonic interface circuit depicted within FIG. 1A including telephone cable 35 may be implemented utilizing so-called "cellular" technology, wherein the interconnection between the telephone network and portable computer device 10 is accomplished utilizing radio frequency transmission. It will be appreciated that cost and size considerations shall be considered in determining the precise type of telephonic interface circuitry to be utilized. Additionally, portable computer device 10 preferably includes a "busy" lamp 33 which is utilized to provide an indication of whether or not communication between portable computer device 10 and a remote central message facility is occurring, without the need for a more complex display. "Busy" lamp 33 may preferably be implemented utilizing a low voltage light emitting diode (LED) or any other suitable means which does not require substantial power. In the depicted embodiment of the present invention, "busy" lamp 33 will be illuminated during communication between portable computer device 10 and a remote central message facility and will flash or "blink" upon completion of that communication, indicating to the user that communication has been terminated.

Figure 1B:
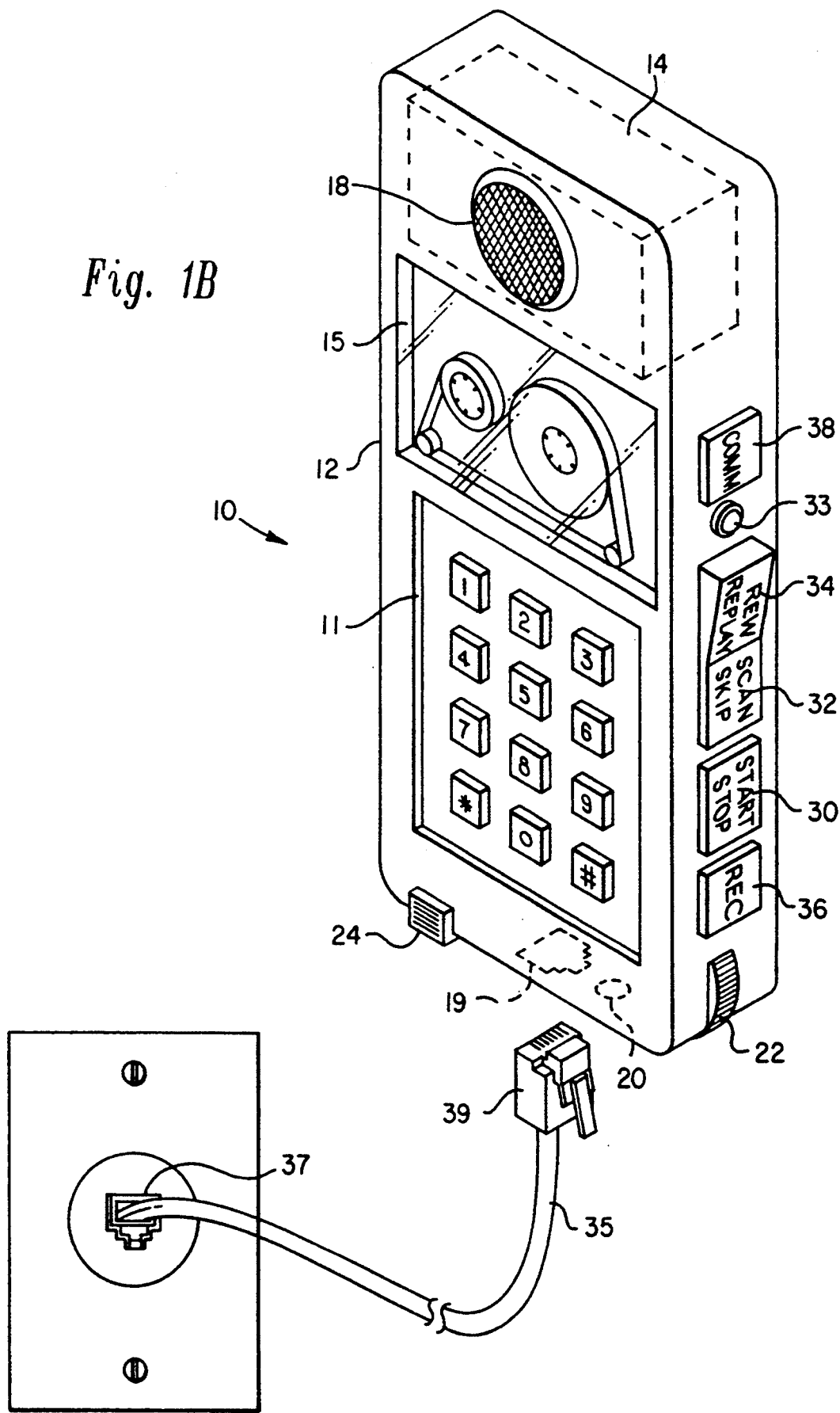
FIG. 1B is a pictorial view of an alternate embodiment of the portable computer device of the present invention.

With reference now to FIG. 1B, there is depicted a pictorial view of an alternate embodiment of portable computer device 10 of the present invention. As above, portable computer device 10 is preferably mounted within a case 12, which is also constructed utilizing molded plastic or other similar lightweight rigid materials. The embodiment depicted within FIG. 1B is identical to the embodiment depicted within FIG. 1A; however, certain additional features are provided within this embodiment. Specifically, a telephone key pad 11 is provided, permitting portable computer device 10 to be utilized in the manner of an ordinary telephone for communication with central message facilities in a real time manner when connection with a telephone network is possible or desirable. Additionally, a microcassette tape mechanism 15 is also provided by utilizing a microcassette recorder such that audible messages may be stored in an analog format, in an alternate embodiment of the present invention. Motor control and audio control circuitry are also provided in conjunction with microcassette mechanism 15 and will be depicted in greater detail below. Microcassette tape mechanism 15 may be provided within portable computer device 10 for FIG. 1A, although not shown.

Each of the operational controls provided for portable computer device 10 are identical to those depicted within FIG. 1A; however, it should also be noted that microphone 24 is located a substantial distance from speaker 18 in this embodiment such that the portable computer device 10 depicted within Figure 1B may be manually held and utilized in the manner of a portable cellular telephone. Those skilled in the art will appreciate that certain minimal separations are therefore necessary between speaker 18 and microphone 24 to approximate the distance between the human ear and the human mouth.

Figure 2:
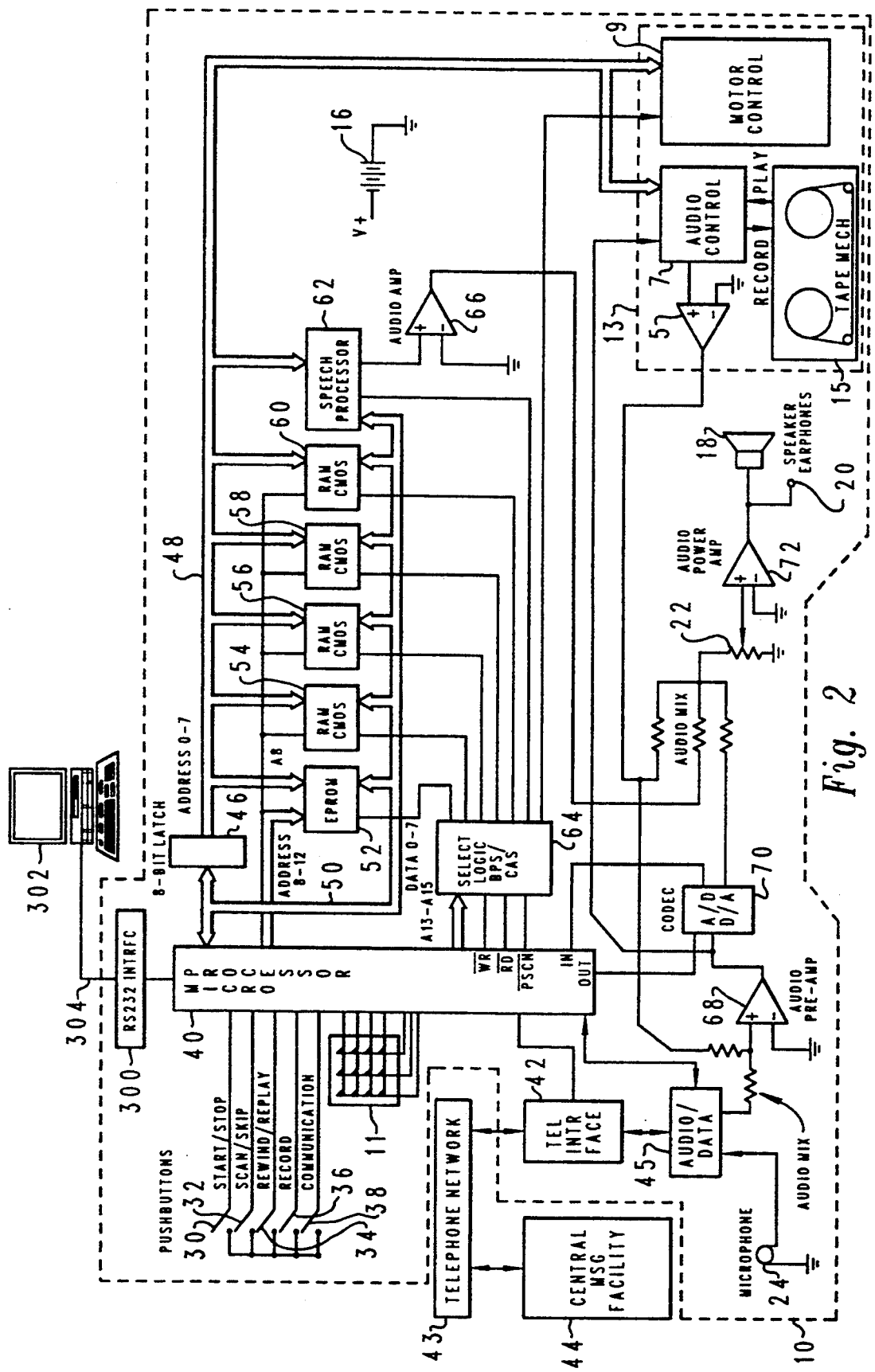
FIG. 2 is a high level block diagram of the electronic circuitry which may be utilized to implement the portable computer device of FIGS. 1A and 1B.

Referring now to FIG. 2, there is depicted a high level block diagram of the electronic circuitry of portable computer device 10 of FIGS. 1A or 1B. Where appropriate, each item within FIG. 2 which has an analogous structure within FIGS. 1A or 1B has been labeled utilizing similar reference numerals to aid in the description herein. Thus, start/stop switch 30, scan/skip switch 32, rewind/replay switch 34, record switch 36 and communication switch 38 are all labeled similarly within FIG. 2. Additionally, telephone key pad 11 of FIG. 1B is also illustrated in schematic form within FIG. 2. As is illustrated, each of these switches is coupled to and scanned by a microprocessor 40. Microprocessor 40 may be implemented utilizing any suitable microprocessor, such as the 80C31, manufactured by Intel Corporation and others, an eight bit microprocessor. Microprocessor 40 is intermittently couplable to one or more remote message facilities 44 via telephonic interface circuit 42, and a standard telephone network 43.

Thus, those skilled in the art will appreciate that a selective and temporary interface between portable computer device 10 and one or more central message facilities 44 may be established by utilizing a standard telephone network, such that electronic messages in either analog or digital data format from a central message facility may be downloaded from or uploaded to a central message facility utilizing portable computer device 10. Telephonic interface circuit 42 may be implemented utilizing a "modem" or any other suitable circuitry which may be utilized to establish and maintain communication over an existing telephone network.

Those skilled in the art will appreciate that a selective and temporary interface between portable computer device 10 and one or more central message facilities 44 may be established utilizing various telephone numbers, passwords and access codes for each associated remote central, message facility. In a depicted embodiment of the present invention, microprocessor 40 utilizes an RS232 Serial Interface 300 which may be coupled to an ordinary so-called "personal" computer 302, such as the International Business Machines: PS/2 Model 25 which has been programmed to load the appropriate telephone numbers, passwords and access codes into portable computer device 10 via a well-known RS232 cable 304. Those skilled in the art will appreciate that a user may be provided appropriate menu-driven interfaces within personal computer 302 to facilitate programming portable computing device 10 with appropriate numbers, passwords and access codes while thus connected. A "training" mode may be activated by depressing record button 36 followed by a communication button 38 in a manner which will be explained in greater detail with reference to FIG. 7.

Alternately, portable computer device 10 may be loaded with appropriate telephone numbers, passwords and access codes by connecting portable computer device 10 in parallel with an ordinary touch-tone telephone via telephone interface circuit 42. As will be explained in greater detail with respect to FIG. 7, portable computer device 10 in a so-called "training" mode may detect and store various touch-tone telephone tones for utilization in accessing a remote central message facility.

Microprocessor 40 is also preferably coupled to a read only memory 52 and random access memory chips 54, 56, 58 and 60, via address latch 46, address bus 48 and data bus 50. Additionally, microprocessor 40 is coupled to speech processor 62. Speech processor 52 is preferably a single chip large scale integration device such as the Federal Screw Works Votrax SC-02 or any other similar software code-based speech synthesis, which utilizes a stored program to create synthetic speech from synthesized allophones or stored encodes representing human speech phonemes. Speech processor 62, when implemented utilizing the aforementioned chip, creates a software programmable digital filter which may be utilized to emulate the human vocal tract.

Microprocessor 40 may then be utilized to link speech signal elements together and provide the amplitude and pitch information necessary to excite the digital filter contained within speech processor 62 in order to create synthetic speech. This is preferably accomplished in the portable computer device of the present invention by utilizing well known text-to-speech conversion rules, such as those created by the Naval Research Laboratory.

In accordance with an important feature of the present invention these text-to-speech rules are preferably stored within one of the aforementioned random access memory chips, in order that the user may modify the rules utilized to pronounce correctly selected specialized vocabulary words, in a manner well known to those ordinarily skilled in the text-to-speech conversion art.

Also preferably stored within random access memory chips 54, 56, 58 and 60 are a plurality of electronic messages, in a textual data format. These messages are preferably downloaded from central message facility 44 via telephonic interface circuit 42 and stored for processing within the random access memory thus provided. Of course, those skilled in the art will appreciate that analog messages may be stored within central message facility 44 utilizing a voice message system. A first embodiment of the present invention contemplates that analog messages thus stored may be coupled to portable computer device 10 via telephone network 43 and telephone interface circuit 44 for storage within portable computer device 10. Analog messages thus received may include an appropriate identifying "header" and may be coupled to audio/data switch 45 for a determination of whether or not the received messages are in digital or analog format and, if desired, analog messages may be coupled through audio preamplifier 68 to CODEC circuit 70 for conversion into digital format and storage in that manner.

Alternately, a microcassette tape recorder 13 or a plurality of analog storage devices, such as charge coupled storage devices, may be utilized to temporarily store such analog messages in an analog format, as a matter of design choice. In the embodiment depicted within FIG. 1B, microcassette tape recorder 13 preferably includes a motor control 9 and an audio control 7 which are coupled to microprocessor 40 and utilized to control microcassette tape mechanism 15 in a manner well known in the art. Thus, audible messages from central message :facility 44 may be stored as analog data by coupling those messages through preamplifier 68 to audio control 7 within microcassette tape recorder 13. Audible inputs from a user through microphone 24 may be amplified and stored in a similar manner.

While the preferred embodiment of the present invention provides presentation means for digital text which retrieves that digital text from memory and converts the digital text to an audio presentation utilizing text-to-speech converted synthesized voice, those skilled in the art will appreciate that a visual presentation, such as a miniature liquid crystal display (LCD) all-points-addressable display may be utilized as a practical alternative presentation means and may be incorporated as an additional feature. This particular presentation means is particularly desirable if the message contains graphical data or numerical tables which are not amenable to conversion into useful synthesized speech but which may be effectively displayed.

When utilizing such a visual display it is contemplated that start/stop switch 30 may be utilized to access the first textual message stored within memory and then couple that textual data to a visual display. If the message contains more data than will fit within the display at one time, scan switch 32 may be utilized to cause the data within the message to scan forward from the current displayed data. Holding scan switch 32 in a depressed position will preferably cause successive lines of text to be displayed. Conversely, rewind switch 34 may be utilized to cause data before that currently displayed to be presented. As will be explained in greater detail below, a double-click on either switch may be utilized to cause the message currently being presented to move forward to the beginning of the next message or return to the beginning of the current message.

A read only memory chip 52 is preferably utilized to store that information which is utilized to interface microprocessor 40 with central message facility 44 via interface 42, and such control information when maybe utilized to record and digitize speech input, in any manner well known to those skilled in this art. Additionally, timing control and the administrative control of speech processor 62 are preferably accomplished utilizing information stored within read only memory 52, in a manner consistent with the component utilized to implement speech processor 62.

Thus, upon the operation of start/stop switch 30, microprocessor 40 first determines whether or not the device is in the "play" or "stop" mode, since this switch may be utilized to toggle back and forth between these two modes. Thereafter, the initiation of the "play" mode is accomplished by microprocessor 40 by accessing the first electronic messages stored within random access memory. Textual data stored therein is then coupled to the text-to-speech application previously described. The speech 22 signals generated by the text-to-speech application are then coupled to speech processor 62, in order to create audible speech which corresponds to the textual data contained within each electronic message. The output of speech processor 62 is then preferably coupled to audio amplifier 66, through volume control 22 to audio power amplifier 72 for eventual output, via speaker 18 or speaker earphone plug 20. Alternatively, digitized audio messages stored within the random access memory are coupled to CODEC circuit 70 for digital-to-analog conversion and then to volume control 22 to audio power amplifier 72 for eventual output, via speaker 18 or speaker earphone plug 20.

In accordance with another novel feature of the present invention, microphone 24 provided with portable computer device 10 may be utilized by the user thereof to input audible speech which is then amplified utilizing audio preamplifier 68 and either stored as analog data utilizing microcassette recorder 13 in one embodiment or coupled to CODEC circuity 70 in a digital circuitry embodiment. As set forth above, CODEC circuit 70 is preferably utilized to perform analog-to-digital conversion or digital-to-analog conversion, as required, and analog messages received at portable computer device 10 or speech input thus digitized, may be stored within random access memory by microprocessor 40.

Thus, should the operator of a digital embodiment of portable computer device 10 desire to input a selected message or comment with regard to a particular electronic message, the operation of record switch 36 in a manner which will be described in greater detail herein will permit the input of a selected amount of digitized speech which, after digitization, is then stored at a specified location for subsequent processing. In accordance with an important feature of the present invention, selected cross-reference information which correlates each response to a particular message or location within that message is preferably stored within random access memory. This cross-reference information may include various identification and header information which may be obtained from the message or response.

Additionally, during recording of digitized speech an output of CODEC circuit 70 is also coupled, via volume control 22 and audio power amplifier 72 to either speaker 18 or speaker earphone jack 20 in order that the operator may assure himself or herself that recording is taking place by providing an amplified feedback signal or, alternatively, by generating an appropriate series of tones indicating the recording mode. Finally, battery 16 is depicted within portable computer device 10 and is utilized to provide electrical power to the components contained therein. By utilizing low voltage, low power consumption CMOS devices portable computer device 10 depicted herein may be operated for a substantial period of time utilizing a common storage cell battery.

Those skilled in the art will appreciate upon reference to the present specification that by providing the capability of collecting and storing messages from a central message facility either digitally or in an analog format utilizing either embodiment of portable computer device 10 described above it will be possible to connect portable computer device 10 to a telephone network for an extended period of time, allowing portable computer device 10 to be utilized as a stand-alone telephone answering machine which may collect messages and thereafter be disconnected from the telephone network and taken by the user for mobile processing of messages recorded in the manner described above. In this manner a user may process audible messages received at portable computer device 10 without requiring the user to remain coupled to the telephone network for substantial periods of time.

Figure 3:
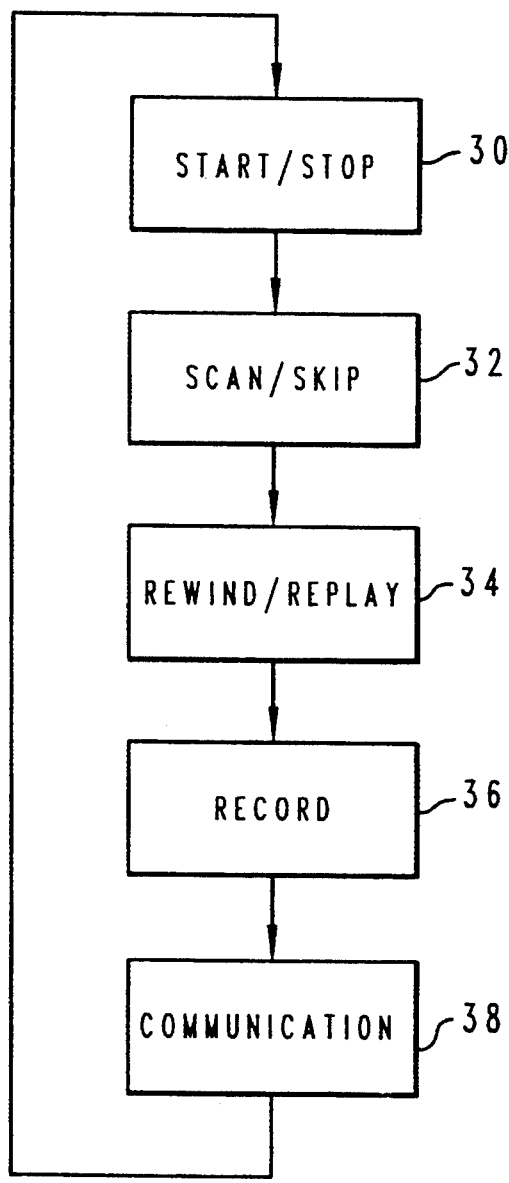
FIG. 3 is a high level flow chart illustrating the polling of each switch of the portable computer device of FIGS. 1A and 1B.

With reference now to FIG. 3, there is depicted a high level flow chart illustrating the polling of each switch of portable computer device 10 of FIG. 1A and 1B. As illustrated, each of the five switches is polled sequentially at a rate of approximately one hundred (100) microseconds per cycle. Thus, the effect of operation of any of the switches thus depicted will be detected in a rapid manner and may then be utilized to vary the operation of portable computer device 10 in a manner which will be described within the remaining figures. This polling of each switch of portable computer device 10 forms a portion of each of the remaining high level block diagrams and is included therein to assist in the description of the manner in which the present invention operates.

Figure 4:
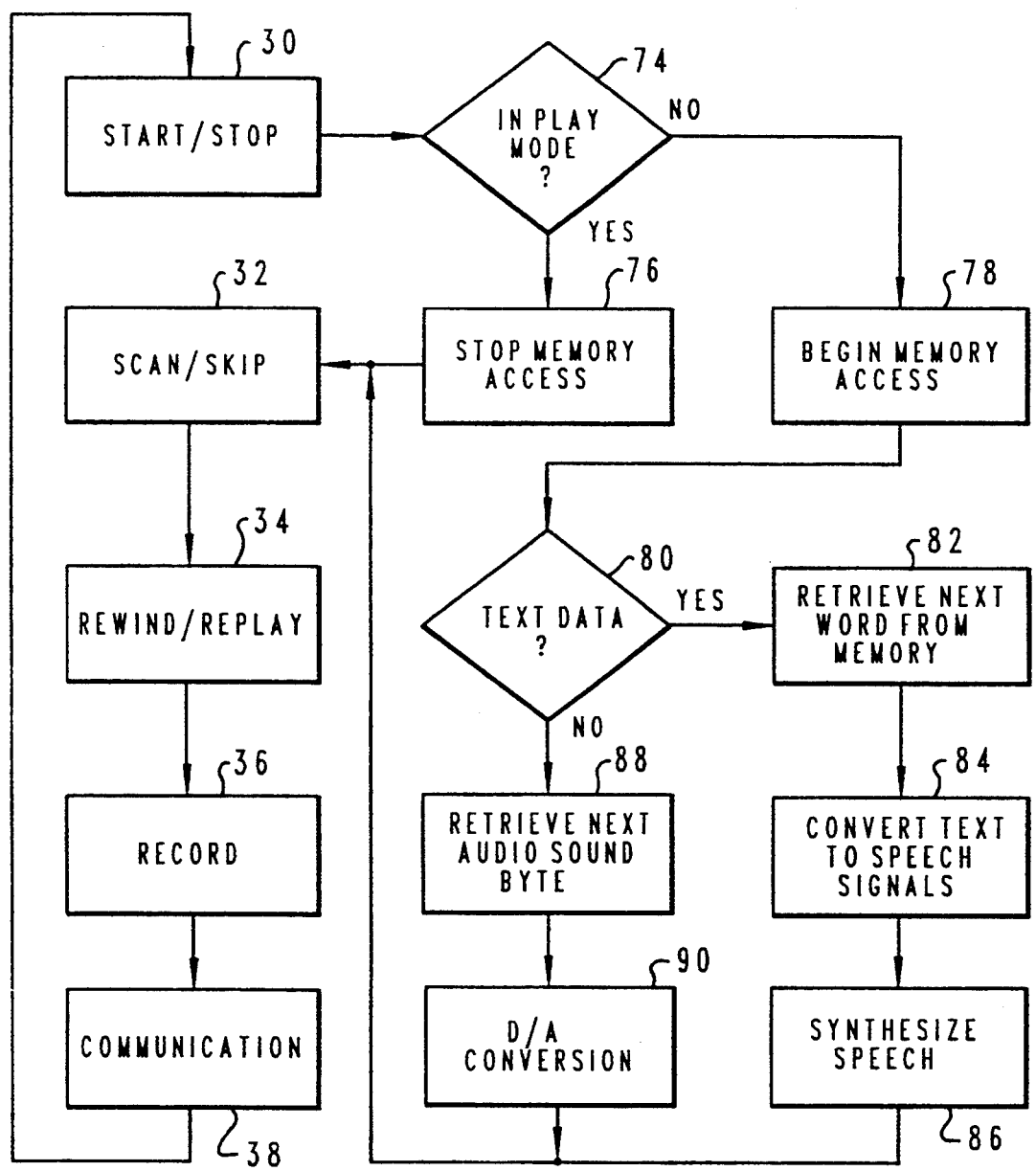
FIG. 4 is a high level flow chart illustrating the "play" mode of the portable computer device of FIGS. 1A and 1B.

With reference now to FIG. 4, there is depicted a high level flow chart illustrating the "play" mode of the portable computer system of FIG. 1A and 1B. As illustrated, during the polling of each switch of portable computer device 10 a detection of the operation of start/stop switch 30 has occurred. Thereafter, the process passes to block 74 which illustrates a determination of whether or not portable computer device 10 is in the "play" mode. This is necessary since start/stop switch 30 may be toggled to alternate the operation of portable computer device 10 between the "stop" mode and the "play" mode. If portable computer device 10 is in the "play" mode, as determined in block 74, then the process passes to block 76 which illustrates the stopping of memory access and the process returns to block 32 to continue polling each switch of portable computer device 10 in the manner described above.

However, in the event portable computer device 10 is in the "stop" mode, as determined in block 74, then the process passes to block 78 which illustrates the beginning of memory access within portable computer device 10. Next, block 80 illustrates a determination of whether or not the data within the random access memory chips described above is textual data. In the depicted embodiment of the present invention data stored within random access memory may include both electronic documents in a textual data format and digitized sound, either recorded by the user or downloaded from a host computer. Alternately, as discussed above, analog storage of audio data may be utilized for storage of audible messages received from a central message facility, such as so-called "phone" mail.

In the event the memory access begins with textual data, as determined in block 80, the process passes to block 82 which illustrates the retrieval of the next textual word from memory. Thereafter, that word is converted to speech signals, as illustrated in block 84 and those speech signals are then utilized to synthesize speech by means of speech processor 62 in the manner described above. This process continues until such time as all data has been accessed from random access memory or start/stop switch 30 has been operated again, returning portable computer device 10 to the "stop" mode.

Referring again to block 80, in the event the data stored within random access memory and currently being accessed comprises digitized audio sound, the process passes to block 88 which illustrates the retrieval of the next audio sound byte. This audio sound byte is then converted to an analog signal, as illustrated in block 90 and the process continues as described above. Thus, upon reference to FIG. 4 those skilled in the art will appreciate that the operation of start/stop switch 30 may be utilized to terminate the audible output of portable computer device 10 or to initiate the sequential access of all electronic documents and/or audio sound messages stored within random access memory and audible processing of that data in the manner described therein.

Figure 5:
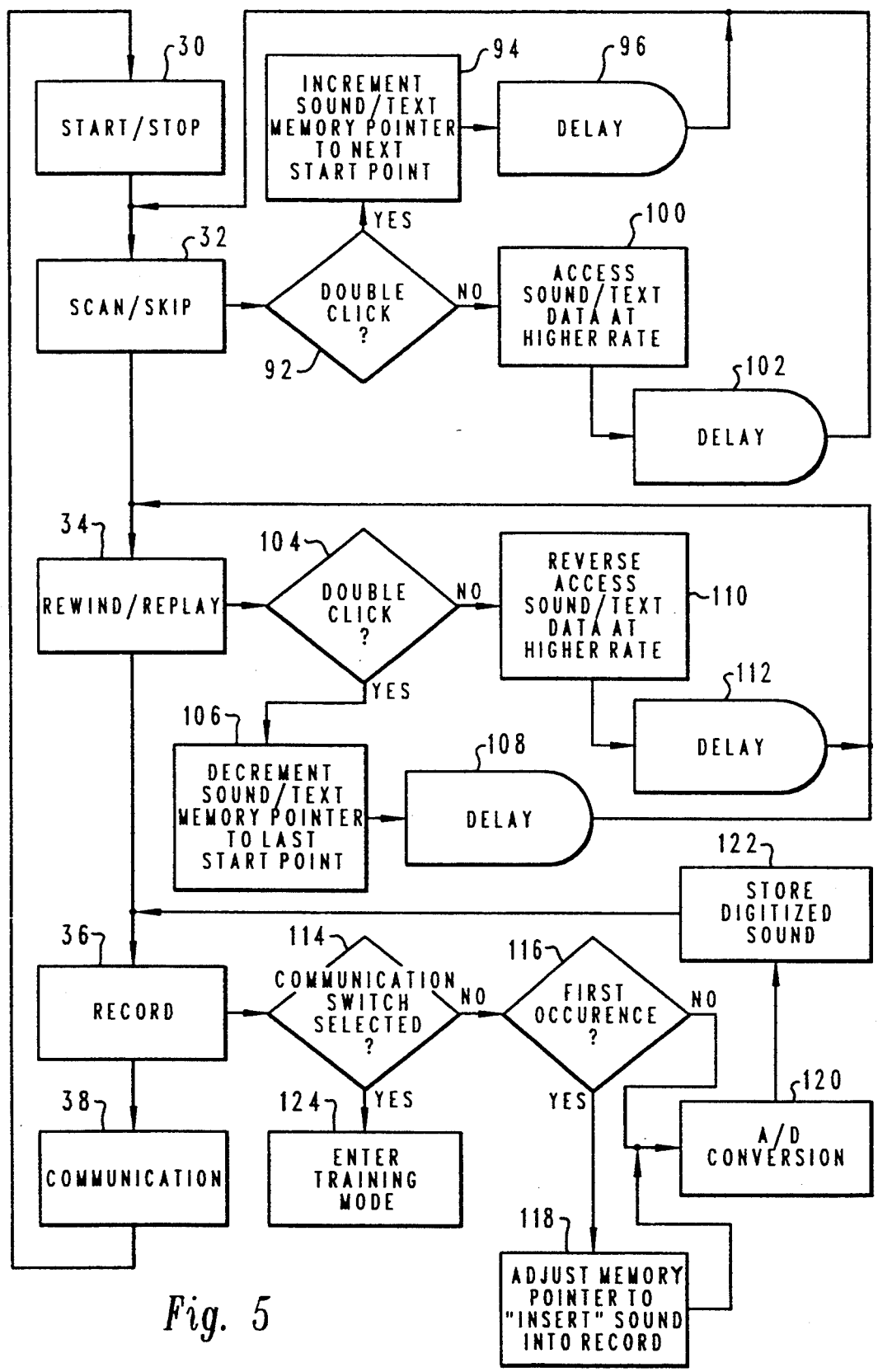
FIG. 5 is a high level flow chart illustrating the "scan/skip," "rewind/replay," and "record" modes of the portable computer device of FIGS. 1A and 1B.

With reference now to FIG. 5, there is depicted a high level flow chart illustrating the "scan/skip," "rewind/replay," and "record" modes of portable computer device 10 of FIG. 1A and 1B. As above, this process is initiated during the polling of each switch of portable computer device 10. In the event scan/skip switch 32 has been operated the process passes to block 92. Block 92 illustrates a determination of whether or not scan/skip switch 32 has been operated in a so-called "double click," indicating that scan/skip switch 32 has been actuated twice within a short period of time. If so, portable computer device 10 is being operated in the "skip" mode and the process passes to block 94 which illustrates the incrementing of the sound/test memory pointer to the next start point within memory. That is, the beginning of the next textual or sound message stored within memory. The process then passes to block 96 which illustrates a short delay and thereafter, the process returns to polling scan/skip switch 32 to determine whether or not a subsequent operation of that switch has occurred.

Referring again to block 92, in the event the operation of scan/skip switch 32 is not a "double dick," the process passes to block 100. Block 100 illustrates the continual addressing of the sound/text data within the random access memory chips described above at a higher rate of speed than normal access speed. The process then continues throughout a predetermined delay, as illustrated at block 102 and then returns to block 32 to determine whether or not scan/skip switch 32 is still closed. By selectively depressing scan/skip switch 32 in this manner, textual or audio data may be "scanned" at a higher rate of speed to locate a selected segment thereof, in a manner similar to the "search" function in a video tape recorder.

Rewind/replay switch 34 operates in a similar manner. After polling each switch and determining that rewind/replay switch 34 has been operated, the process passes to block 104 which illustrates a determination of whether or not rewind/replay switch 34 has been operated in a so-called "double click." If so, the process passes to block 106 which depicts the decrementing of the sound/text memory pointer to the last start point previously encountered. In this manner an operator may rapidly and efficiently return to the beginning of the previous electronic message stored within portable computer device 10. Thereafter, after a short delay depicted at block 108 the process returns to polling the switches to determine whether or not rewind/replay switch 34 has been actuated a second time.

Referring again to block 104, in the event the operation of rewind/replay switch 34 detected is not a so-called "double click," the process passes to block 110. In a manner similar to that described above, block 110 illustrates the accessing of the sound/text data within memory in a reverse order, at a higher rate of speed than normal access speed. After a predetermined delay, as illustrated in block 106, the process again returns to the polling procedure to determine whether or not rewind/replay switch 34 remains closed.

Next, in the event the polling of each switch within portable computer device 10 indicates that record switch 36 has been operated, the process passes to block 114. Block 114 illustrates a determination of whether or not communication switch 38 has also been selected within a predetermined period of time after selection of record switch 36. If so, 33 portable computer device 10 will enter the "training" mode, as depicted in block 124 and further illustrated in FIG. 7. In the event communication switch 38 is not selected in conjunction with record switch 36 the process passes to block 116.

Block 116 illustrates a determination of whether or not this is a first occurrence of the operation of record switch 36 and if so, the process passes to block 118 which adjusts the memory pointer to "insert" a digitized sound segment into the record of the electronic message currently being processed. Those skilled in the art will appreciate that, unlike analog recording techniques, a digital memory system permits extreme flexibility with regard to the ability of the user to insert text or sound into a digital record by the mere adjustment of a memory pointer in the manner described.

Thereafter, or in the event this is not the first detection of the operation of record switch 36, the process passes to block 120 which illustrates the analog-to-digital conversion of the audio input. Thereafter, block 122 illustrates the storing of the digitized sound and the process again returns to continue polling the switches of portable computer device 10. Of course, as discussed above, analog storage of audio input may also be utilized.

Figure 6:
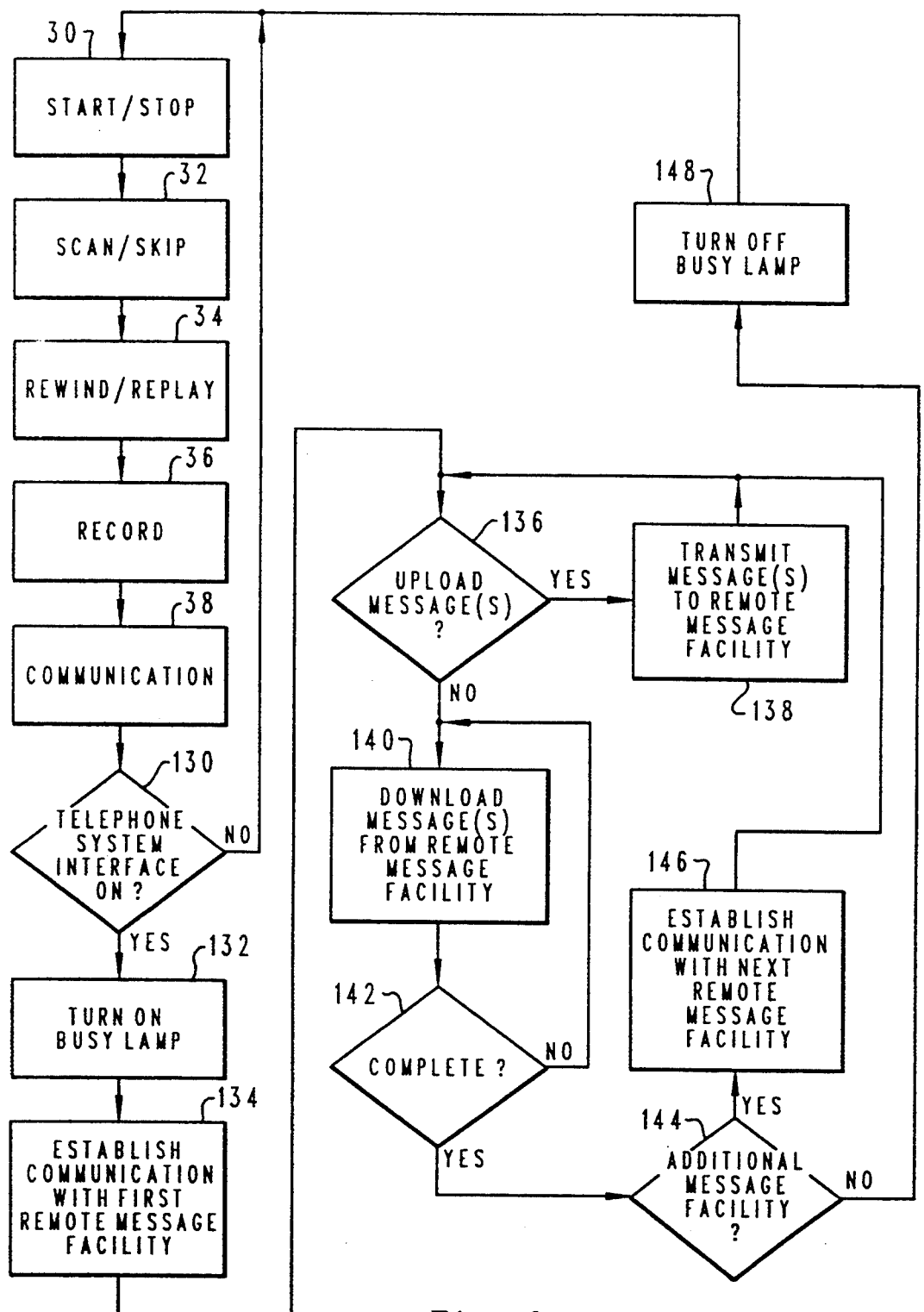
FIG. 6 is a high level flow chart illustrating the "communication" mode of the portable computer device of FIGS. 1A and 1B.

Referring now to FIG. 6 there is depicted a high level flow chart illustrating the "communication" mode of portable computer device 10 of FIG. 1A and 1B. As described with respect to FIG. 1A and 1B portable computer device 10 includes a communication switch 38 which, when operated, serves to establish communication between portable computer device 10 and one or more remote central message facilities 44 utilizing telephone interface circuit 42 (see FIG. 2) in a manner which will be described in greater detail below. Thus, when communication switch 38 has been operated, the process passes to block 130. Block 130 illustrates a determination of whether or not the telephone system interface is present. That is, whether or not portable computer device 10 is linked to a telephone 33 network utilizing telephone cable 35 in the manner described with respect to FIG. 1A and 1B or alternatively, by utilizing cellular technology. If no interface with a telephone system is detected, the process returns to block 30 and continues to poll the switches of portable computer device 10 to detect the subsequent operation of any selected switch depicted therein.

However, in the event a telephone system interface is present, as determined at block 130, the process passes to block 132. Block 132 depicts the turning on of "busy" lamp 33 (see FIG. 1A and 1B) and the blinking of "busy" lamp 33 at a predetermined rate, indicating the termination of communication between portable computer device 10 and a remote central message facility, indicating that communication between portable computer device 10 and a remote central message facility is occurring. Thereafter, the process passes to block 134.

Block 134 illustrates the establishment of communication with a first remote message facility. Those skilled in the electronic communication art will appreciate that this may be accomplished utilizing modem type technology wherein a DTMF chip is utilized to simulate the dialing of a touch-tone telephone, in a manner well known in the electronic communications art. Additionally, it should be apparent to those skilled in the art, upon reference to the present specification, that the establishment of communication between portable computer device 10 and a remote central message facility may also include the automatic proffer of selected passwords or access identifiers by portable computer device 10, in order to establish the identity of the user of that device. Thereafter, the process passes to block 136.

Block 136 illustrates a determination of whether or not any messages, either textual or audio, are contained within portable computer device 10 which need to be uploaded to the remote central message facility. If so, the process passes to block 138. Block 138 illustrates the transmittal of those messages utilizing any acceptable data transmission format to the remote central message facility in either digital or analog form and the process then iterates until such time as no further messages require uploading to the remote central message facility. It should be apparent upon reference to the foregoing that by first automatically uploading messages to the remote central message facility prior to downloading messages from that facility, a maximum amount of memory will be available within portable computer device 10 for storage of such messages.

Next, after completion of the uploading of all messages to the remote central message facility, the process passes to block 140. Block 140 illustrates the downloading of any messages stored at the remote central message facility for the user of portable computer device 10. The process then passes to block 142 which illustrates a determination of whether or not the downloading of such messages has been completed. If not, the process merely iterates until such time as all messages from the remote central message facility for the user of portable computer device 10 have been downloaded.

Thereafter, the process passes to block 144. Block 144 illustrates a determination of whether or not additional central message facilities exist which may contain messages for the user of portable computer device 10. It should be apparent to those skilled in this art that a user may have access to one or more central message facilities and may wish to utilize portable computer device 10 to audibly process messages stored at each such remote message facility. If additional message facilities exist, as determined at block 144, the process passes to block 146. Block 146 illustrates the establishment of communication with the next remote message facility and the process then returns to block 136 to upload and download messages in the manner previously described.

Referring again to block 144, in the event no additional message facilities exist which may contain textual or audible messages for the user of portable computer device 10 the process passes to block 148. Block 148 illustrates the turning off of "busy" lamp 33 (see FIG. 1A and 1B), indicating that communication between portable computer device 10 and all remote central message facilities has terminated. A user of portable computer device 10 may then terminate the interface between portable computer device 10 and the telephone network. Thereafter, the process returns to block 30 to once again continue polling the various switches present within portable computer device 10.

Figure 7:
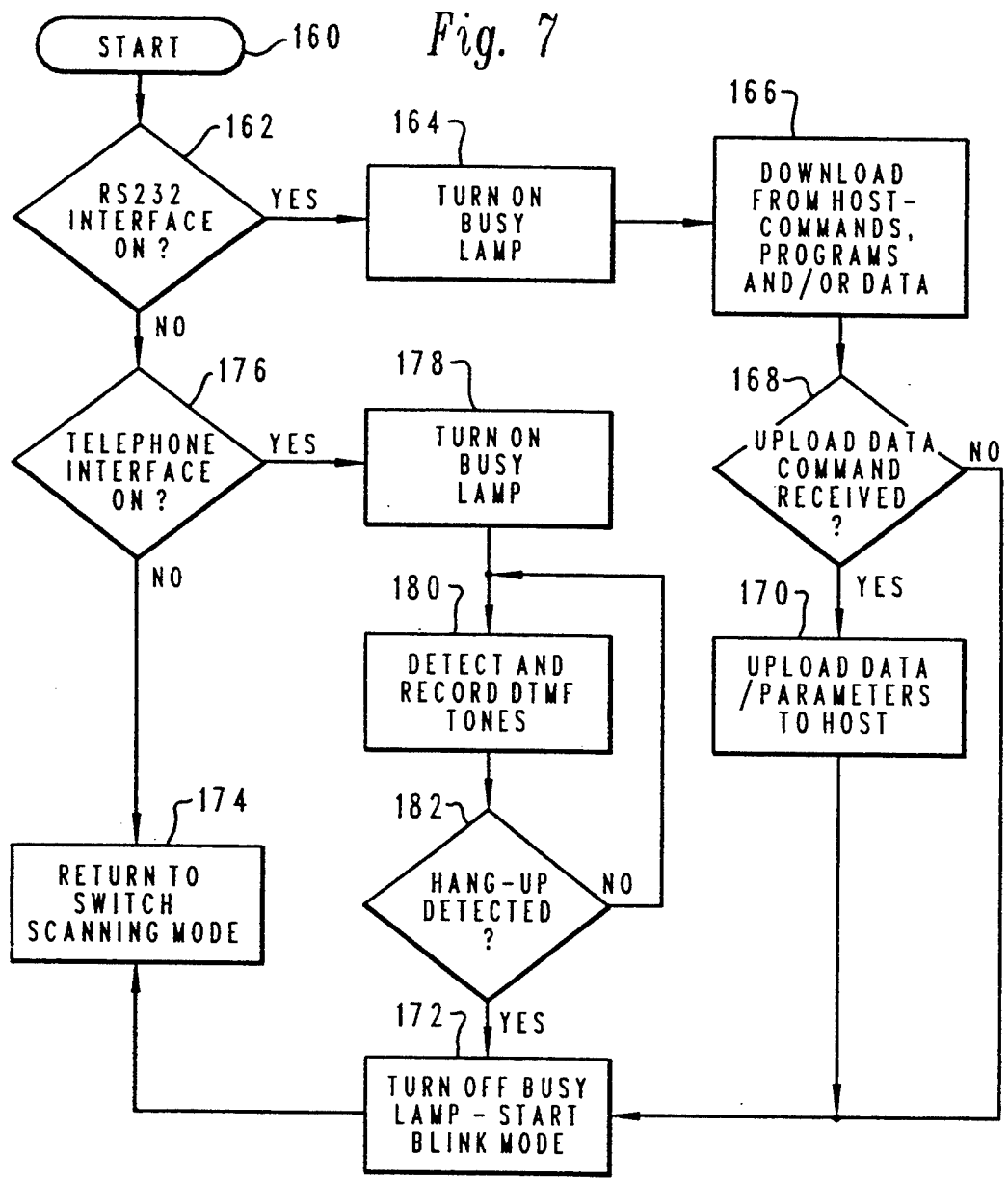
FIG. 7 is a high level flowchart illustrating the "training" mode of the portable computer device of FIGS. 1A and 1B.

With reference now to FIG. 7, there is depicted a high level flowchart illustrating the "training" mode of the portable computer device of FIG. 1A and 1B. As described above, the "training" mode is entered by selecting communication switch 38 within a predetermined period of time after selection of record switch 36. As illustrated, the "training" mode process begins at block 160 and thereafter passes to block 162 which illustrates a determination of whether or not the RS232 interface 300 (see FIG. 2) has been enabled. If so, the process passes to block 164 which illustrates the turning on of busy lamp 33 (see FIG. 1A and 1B). Thereafter, block 166 depicts the downloading from the host, the various commands, programs and/or data required to train portable computer device 10 with the necessary information to communicate with a remote central message facility. As depicted in FIG. 2, this information may be downloaded to portable computer device 10 from a so-called personal computer.

Next, the process passes to block 168 which illustrates a determination of whether or not an upload data command has been received from the host computer. If so, the process passes to block 170 which illustrates the uploading of data and/or parameters to the host computer. Thereafter, or in the event an upload data command has not been received, as determined at block 168, the process passes to block 172. Block 172 depicts the turning off of the "busy" lamp and the starting of a "blink" sequence, indicating that the training mode has been terminated. Thereafter, as illustrated at block 174, the process returns to switch scanning in the manner described above.

Referring again to block 162, in the event the RS232 interface is not enabled, the process passes to block 176. Block 176 illustrates a determination of whether or not the telephone system interface provided by telephone interface circuit 42 (see FIG. 2) is enabled. If so, the process passes to block 178 which again illustrates the turning on of the "busy" lamp. Thereafter, the process passes to block 180. Block 180, in accordance with an important feature of the present invention, illustrates the manner in which portable computer device 10 may be programmed utilizing a standard touch-tone telephone. Block 180 therefore illustrates the detection and recording of DTMF tones generated by a standard touch-tone telephone which is coupled to portable computer device 10 utilizing telephone interface circuit 42.

Thereafter, the process passes to block 182 which illustrates a determination of whether or not a "hang-up" has been detected. If not, the process iteratively returns to block 180 and continues to detect and record DTMF tones for future utilization. Upon a completion of training of portable computer device 10 utilizing a standard touch-tone telephone, as described above, and the detection of a "hang-up" the process passes to block 172. As described above, block 172 illustrates the turning off of the "busy" lamp and the starting of a "blink" function feature, indicating that training has been complete. Again, the process then returns to block 174 which depicts the returning to the switch scanning mode. Referring again to block 176, in the event the telephone system interface is not enabled, the process merely returns to block 174 to return to switch scanning.

Upon reference to FIG. 7, those skilled in the art will appreciate that the Applicants herein have provided two novel techniques whereby portable computer device 10 may be "trained" to automatically communicate with a remote central message facility by utilizing either a computer coupled to portable computer device 10 via a standard RS232 interface or by the simple expedient of detecting and recording DTMF tones generated by a standard touch-tone telephone which is coupled to portable computer device 10 utilizing telephone interface circuit 42.

Upon reference to the foregoing those skilled in the art will appreciate that the Applicants in the present application have provided a novel, useful and unobvious portable computer device which permits the efficient audible processing of electronic messages from a remote control message facility which are downloaded to and stored within such a device by utilizing a telephone interface circuit in a manner which permits the substantial miniaturization of the controls associated with the portable computer device and greatly enhances the ability of a user to operate such a device in an environment wherein the user's hands and eyes are otherwise occupied.

While the invention has been particularly shown and described with reference to a preferred embodiment, it will be understood by those skilled in the art that various changes in form and detail may be made therein without departing from the spirit and scope of the invention.

We claim:

1. A portable hand-held computer device for processing messages stored at a remote central message facility accessible via telephonic communications, said portable hand-held computer device comprising:

processor means;

memory means coupled to said processor means for storing a plurality of messages;

telephonic interface means coupled to said processor means for selectively and temporarily interconnecting said portable hand-held computer device with a telephonic network;

first switch means coupled to said processor means for automatically establishing communications between said remote central message facility and said portable hand-held computer device in response to an actuation thereof while said portable hand-held computer device is interconnected with said telephonic network;

communications means coupled to said processor means for transferring at least one message in a digital data format from said remote central message facility to said memory means in response to said establishing of communication between said remote central message facility and said portable hand-held computer device; and digital data-to-speech conversion means coupled to said memory means for selectively outputting said at least one message from said memory means and for creating speech signals representative of digital data wherein said at least one message may be audibly discerned.

2. The portable hand-held computer device for processing messages stored at a remote central message facility accessible via telephonic communications according to claim 1, wherein said portable hand-held computer device includes analog storage means and wherein said at least one message stored within memory means is stored in analog data format.

3. The portable hand-held computer device for processing messages stored at a remote central message facility accessible via telephonic communications according to claim 2, wherein said analog storage means comprises a microcassette tape recorder.

4. The portable hand-held computer device for processing messages stored at a remote central message facility accessible via telephonic communications according to claim 1, wherein said presentation means further includes audio output means coupled to said digital data-to-speech conversion means for creating audible speech from said speech signals.

5. The portable hand-held computer device for processing messages stored at a remote central message facility accessible via telephonic communications according to claim 1, further including analog-to-digital conversion means coupled to said communications means for converting audio messages transferred from said remote central message facility into digital data format prior to storage within said memory means.

6. The portable hand-held computer device for processing messages stored at a remote central message facility accessible via telephonic communications according to claim 1, further including status indication means coupled to said communication means for visually indicating communication between said remote central message facility and said portable hand-held computer device.

7. The portable hand-held computer device for processing messages stored at a remote central message facility accessible via telephonic communications according to claim 6, wherein said status indication means comprises a light emitting diode.

8. The portable hand-held computer device for processing messages stored at a remote central message facility accessible via telephonic communications according to claim 1, wherein said portable hand-held computer device includes a battery for providing electrical power thereto.

9. A portable hand-held computer device for processing messages stored at a remote central messages facility accessible via telephonic communications, said portable hand-held computer device comprising:

processor means;

memory means coupled to said processor means for storing a plurality of messages;

telephonic interface means coupled to said processor means for selectively and temporarily interconnecting said portable hand-held computer device with a telephonic network;

first switch means coupled to said processor means for automatically establishing communication between said remote central message facility and said portable hand-held computer device in response to an actuation thereof while said portable hand-held computer device is interconnected with said telephonic network;

communications means coupled to said processor means for transferring at least one message from said remote central message facility to said memory means in response to said establishing of communication between said remote central message facility and said portable hand-held computer device;

presentation means coupled to said memory means for selectively outputting said at least one message from said memory means in a user discernable format; and audio input means coupled to said processor means for receiving audible speech and generating a plurality of digital signals corresponding thereto;

second switch means for causing said plurality of digital signals corresponding to said audible speech to be coupled to said memory means and stored therein in response to a single operation thereof; and means for generating an audible indication of actuation of said second switch means.

10. The portable hand-held computer device for processing messages stored at a remote central message facility accessible via telephonic communications according to claim 9, wherein said at least one message stored within said memory means is stored in digital data format and wherein said presentation means includes digital data-to-speech conversion means coupled to said processor means for creating speech signals representative of digital data.

11. The portable hand-held computer device for processing messages stored at a remote central message facility accessible via telephonic communications according to claim 9, wherein said portable hand-held computer device includes analog storage means and wherein said at least one message stored within memory means is stored in analog data format.

12. The portable hand-held computer device for processing messages stored at a remote central message facility accessible via telephonic communications according to claim 11, wherein said analog storage means comprises a microcassette tape recorder.

13. The portable hand-held computer device for processing messages stored at a remote central message facility accessible via telephonic communications according to claim 10, wherein said presentation means further includes audio output means coupled to said digital data-to-speech conversion means for creating audible speech from said speech signals.

14. The portable hand-held computer device for processing messages stored at a remote central message facility accessible via telephonic communications according to claim 9, further including analog-to-digital conversion means coupled to said communications means for converting audio messages transferred from said remote central message facility into digital data format prior to storage within said memory means.

15. The portable hand-held computer device for processing messages stored at a remote central message facility accessible via telephonic communications according to claim 9, further including status indication means coupled to said communication means for visually indicating communication between said remote central message facility and said portable hand-held computer device.

16. The portable hand-held computer device for processing messages stored at a remote central message facility accessible via telephonic communications according to claim 15, wherein said status indication means comprises a light emitting diode.

17. The portable hand-held computer device for processing messages stored at a remote central message facility accessible via telephonic communications according to claim 9, wherein said communication means further includes means for transferring said plurality of digital signals corresponding to said audible speech from said memory means to said remote central message facility in response to said establishing of communication between said remote central message facility and said portable hand-held computer device prior to transferring said at least one message from said remote central message facility to said memory means.

18. The portable hand-held computer device for processing messages stored at a remote central message facility accessible via telephonic communications according to claim 9, wherein said portable hand-held computer device includes a battery for providing electrical power thereto.

19. A portable hand-held computer device for processing messages stored at a remote central message facility accessible via telephonic communications, said portable hand-held computer device comprising:
  processor means;
  memory means coupled to said processor means for storing a plurality of messages;
  telephonic interface means coupled to said processor means for selectively and temporarily interconnecting said portable hand-held computer device with a telephonic network;
  first switch means coupled to said processor means for automatically establishing communication between said remote central message facility and said portable hand-held computer device in response to an actuation thereof while said portable hand-held computer device is interconnected with said telephone network;
  communication means coupled to said processor means for transferring a plurality of messages from said remote central message facility to said memory means in response to said establishing of communication between said remote central message facility and said portable hand-held computer device;
  presentation means coupled to said memory means for selectively outputting said plurality of messages from said memory means in a user discernable format at a predetermined rate;
  scan switch means coupled to said processor means for sequentially accessing said plurality of messages and for coupling said plurality of messages to said presentation means at a higher rate than said predetermined rate in response to an operation thereof; and
  audio input means coupled to said processor means for receiving audible speech and generating a plurality of digital signals corresponding thereto;
  second switch means for causing said plurality of digital signals corresponding to said audible speech to be coupled to said memory means and stored therein in response to a single operation thereof; and
  means for generating an audible indication of actuation of said second switch means.

20. The portable hand-held computer device for processing messages stored at a remote central message facility accessible via telephonic communications according to claim 19, wherein said plurality of messages stored within said memory means are stored in digital data format and wherein said presentation means includes digital data-to-speech conversion means coupled to said processor means for creating speech signals representative of digital data.

21. The portable hand-held computer device for processing messages stored at a remote central message facility accessible via telephonic communications according to claim 19, wherein said portable hand-held computer device includes analog storage means and wherein said plurality of messages are stored in analog data format.

22. The portable hand-held computer device for processing messages stored at a remote central message facility accessible via telephonic communications according to claim 21, wherein said analog storage means comprises a microcassette tape recorder.

23. The portable hand-held computer device for processing messages stored at a remote central message facility accessible via telephonic communications according to claim 20, wherein said presentation means further includes audio output means coupled to said digital data-to-speech conversion means for creating audible speech from said speech signals.

24. A portable hand-held computer device for processing messages stored at a remote central message facility accessible via telephonic communications, said portable hand-held computer device comprising:
  a case having external dimensions suitable sized to permit said case to be held in a human hand;
  processor means disposed within said case;
  memory means disposed within said case and coupled to said processor means for storing a plurality of messages;
  telephonic interface means coupled to said processor means for selectively and temporarily interconnecting said portable hand-held computer device with a telephonic network;
  first switch means mounted to said case and coupled to said processor means for automatically establishing communication between said remote central message facility and said portable hand-held computer device in response to an actuation thereof while said portable hand-held computer device is interconnected with said telephonic network;

communications means coupled to said processor means for transferring a plurality of messages from said remote central message facility to said memory means in response to said establishing of communication between said remote central message facility and said portable hand-held computer device;

presentation means coupled to said memory means for selectively outputting said plurality of messages stored within said memory means in a user discernable format;

second switch means mounted to said case and coupled to said processor means for causing said plurality of messages to be coupled to said presentation means in a serial fashion in response to a single operation thereof;

audio input means coupled to said processor means for receiving audible speech and generating a plurality of digital signals corresponding thereto;

third switch means for causing said plurality of digital signals corresponding to said audible speech to be coupled to said memory means and stored therein in response to a single operation thereof; and means for generating an audible indication of actuation of said third switch means.

25. The portable hand-held computer device for processing messages stored at a remote central message facility accessible via telephonic communications according to claim 24, wherein said portable hand-held computer device includes analog storage means and wherein said plurality of messages are stored in analog data format.

26. The portable hand-held computer device for processing messages stored at a remote central message facility accessible via telephonic communications according to claim 25, wherein said analog storage means comprises a microcassette recorder.

27. The portable hand-held computer device for processing messages stored at a remote central message facility accessible via telephonic communications according to claim 24, wherein said plurality of messages stored within said memory means are stored in digital data format and wherein said presentation means includes digital data-to-speech conversion means coupled to said processor means for creating speech signals representative of digital data.

28. The portable hand-held computer device for processing messages stored at a remote central message facility accessible via telephonic communications according to claim 27, wherein said presentation means further includes audio output means coupled to said digital data-to-speech conversion means for creating audible speech from said speech signals.

29. The portable hand-held computer device for processing messages stored at a remote central message facility accessible via telephonic communications according to claim 24, further including analog-to-digital conversion means coupled to said communications means for converting audio messages transferred from said remote central message facility into digital data format prior to storage within said memory means.

30. The portable hand-held computer device for processing messages stored at a remote central message facility accessible via telephonic communications according to claim 24, further including status indication means coupled to said communication means for visually indicating communication between said remote central message facility and said portable hand-held computer device.

* * * * *

UNITED STATES PATENT AND TRADEMARK OFFICE
CERTIFICATE OF CORRECTION

PATENT NO. : 5,444,768
DATED : August 22, 1995
INVENTOR(S) : Lemaire et al.

It is certified that error appears in the above-indentified patent and that said Letters Patent is hereby corrected as shown below:

Column 13, line 2: change "double dick" to
--double click--

Signed and Sealed this

Twenty-third Day of July, 1996

Attest:

Attesting Officer

BRUCE LEHMAN

Commissioner of Patents and Trademarks